US012253100B2

(12) United States Patent
Smart

(10) Patent No.: US 12,253,100 B2
(45) Date of Patent: Mar. 18, 2025

(54) ELIMINATING BLEED ON FLOW CONTROLS

(71) Applicant: Dresser, LLC, Houston, TX (US)

(72) Inventor: Harold Randall Smart, Portsmouth, RI (US)

(73) Assignee: Dresser, LLC, Houston, TX (US)

( * ) Notice: Subject to any disclaimer, the term of this patent is extended or adjusted under 35 U.S.C. 154(b) by 222 days.

(21) Appl. No.: 17/538,667

(22) Filed: Nov. 30, 2021

(65) Prior Publication Data

US 2023/0167834 A1 Jun. 1, 2023

(51) Int. Cl.
*F15B 13/043* (2006.01)
*F15B 13/04* (2006.01)

(52) U.S. Cl.
CPC ...... *F15B 13/0433* (2013.01); *F15B 13/0405* (2013.01); *F15B 2211/30535* (2013.01); *F15B 2211/6309* (2013.01); *F15B 2211/6336* (2013.01)

(58) Field of Classification Search
CPC .... F15B 2211/30535; F15B 2211/6309; F15B 2211/6336; F15B 13/0433; F15B 13/0405; F15B 13/0426; F15B 13/0435; F15B 2211/327; F15B 2211/3111; F15B 2211/329; F15B 2013/0412; F15B 5/006; F16K 1/443; F16K 11/105; G05D 16/14; G05D 16/16; G05D 16/166; G05D 16/18; G05D 16/187
USPC .......................... 137/625.66, 625.27, 87.01, 137/614.16–614.18, 614.21, 84–86
See application file for complete search history.

(56) References Cited

U.S. PATENT DOCUMENTS

| | | | | |
|---|---|---|---|---|
| 1,029,687 A * | 6/1912 | Johnson | F01D 17/26 | 251/29 |
| 3,736,960 A * | 6/1973 | Cohen | F16K 31/383 | 137/625.6 |
| 4,050,478 A * | 9/1977 | Virtue | F04B 49/007 | 137/625.69 |
| 5,439,021 A * | 8/1995 | Burlage | F15B 5/006 | 137/84 |
| 5,682,918 A * | 11/1997 | Stoll | G05D 16/185 | 137/627.5 |
| 6,957,127 B1 * | 10/2005 | Smart | G05B 7/02 | 700/289 |
| 7,940,189 B2 * | 5/2011 | Brown | F16K 37/0075 | 340/605 |
| 8,036,837 B2 * | 10/2011 | Wilke | F16K 37/0083 | 73/861.47 |

(Continued)

FOREIGN PATENT DOCUMENTS

WO 2013059773 A1 4/2013

OTHER PUBLICATIONS

Product manual, "Masoneilan SVI II AP Positioner with Optional High Flow" 2020.

*Primary Examiner* — Craig J Price
(74) *Attorney, Agent, or Firm* — Paul Frank + Collins P.C.

(57) ABSTRACT

An amplifier is configured for use in a control valve. These configurations provide a pneumatic signal to an actuator that regulates flow through the device. The amplifier may include a variable orifice, or bleed valve, that moves in response to changes in actuating media around steady state. This bleed valve prevents bleed of actuating media at steady state. This feature reduces energy consumption or emissions from the control valve.

20 Claims, 8 Drawing Sheets

(56) References Cited

U.S. PATENT DOCUMENTS

| | | | | |
|---|---|---|---|---|
| 8,205,632 | B2 * | 6/2012 | Fishwick | F16K 31/124 137/625.66 |
| 8,256,739 | B2 * | 9/2012 | Pfaff | F16K 31/406 251/30.02 |
| 8,312,892 | B2 * | 11/2012 | Wilke | F16K 37/0066 137/557 |
| 8,352,048 | B2 * | 1/2013 | Kresse | F16K 37/0041 700/282 |
| 8,412,358 | B2 * | 4/2013 | Kresse | F16K 37/0083 700/282 |
| 8,579,252 | B2 * | 11/2013 | Heer | F15B 20/002 251/73 |
| 8,622,072 | B2 * | 1/2014 | Lovell | F15B 13/0405 137/415 |
| 8,689,832 | B2 * | 4/2014 | Lovell | F16K 47/08 137/596.14 |
| 8,807,168 | B2 * | 8/2014 | Lovell | F15B 13/0405 137/596.14 |
| 8,910,659 | B2 * | 12/2014 | Rub | F15B 13/015 137/596.2 |
| 9,010,376 | B2 * | 4/2015 | Watts | G05D 16/101 137/625.2 |
| 9,109,718 | B2 * | 8/2015 | Inagaki | F15B 5/006 |
| 9,222,490 | B2 * | 12/2015 | Fishwick | F16K 31/1268 |
| 9,404,515 | B2 * | 8/2016 | Esposito | F15B 21/08 |
| 9,465,391 | B2 * | 10/2016 | Grumstrup | F16K 31/42 |
| 9,846,102 | B2 * | 12/2017 | Tharaldson | G01M 3/00 |
| 10,274,103 | B2 * | 4/2019 | Kah | F16K 31/42 |
| 10,474,169 | B2 * | 11/2019 | Grödl | G05D 16/101 |
| 10,598,194 | B2 * | 3/2020 | Gunell | F16K 11/048 |
| 10,670,054 | B2 * | 6/2020 | Cohen | F15B 5/006 |
| 10,711,810 | B2 * | 7/2020 | Wagner-Stuerz | F15B 13/0433 |
| 10,724,555 | B2 * | 7/2020 | Watts | F16K 31/12 |
| 11,480,201 | B2 * | 10/2022 | Stegmanns | F15B 13/042 |
| 2005/0242310 | A1 * | 11/2005 | Takiguchi | F16K 31/1245 251/28 |
| 2010/0139781 | A1 | 6/2010 | Lovell | |
| 2013/0105714 | A1 | 5/2013 | Watts | |
| 2018/0045227 | A1 | 2/2018 | Gunell et al. | |
| 2019/0032683 | A1 | 1/2019 | Watts | |

* cited by examiner

ELIMINATING BLEED ON FLOW CONTROLS

BACKGROUND

Flow controls play a large role in many industrial facilities. Power plants and industrial process facilities, for example, use different types of flow controls to manage flow of a material, typically fluids, throughout vast networks of pipes, tanks, generators, and other equipment. Control valves are useful to accurately regulate flow to meet process parameters. These valves often use a pneumatic actuator to maintain a position of a closure member relative to a seat. An amplifier may connect with the pneumatic actuator. This amplifier may regulate flow of actuating media, like pressurized air (or "instrument air") or pressurized natural gas, to the pneumatic actuator. It is not uncommon for the amplifier to inherently bleed actuating media, particularly with the valve in its steady state.

SUMMARY

The subject matter of this disclosure relates to improvements that can reduce or even eliminate bleed in amplifiers at steady state. Of particular interest here are embodiments that incorporate a variable orifice or "bleed" valve into the vent/supply valve structure. This bleed valve foregoes the need for the vent valve to remain open at steady state, which assures that the amplifier no longer constantly vents actuating media to atmosphere. This feature can lead to potential reductions in carbon dioxide ($CO_2$) emissions because it reduces energy consumption necessary to run compressors or pumps to provide instrument air or, for natural gas fed devices, the proposed design reduces methane emissions into the air.

DRAWINGS

Reference is now made briefly to the accompanying drawings, in which.

Figure 1:
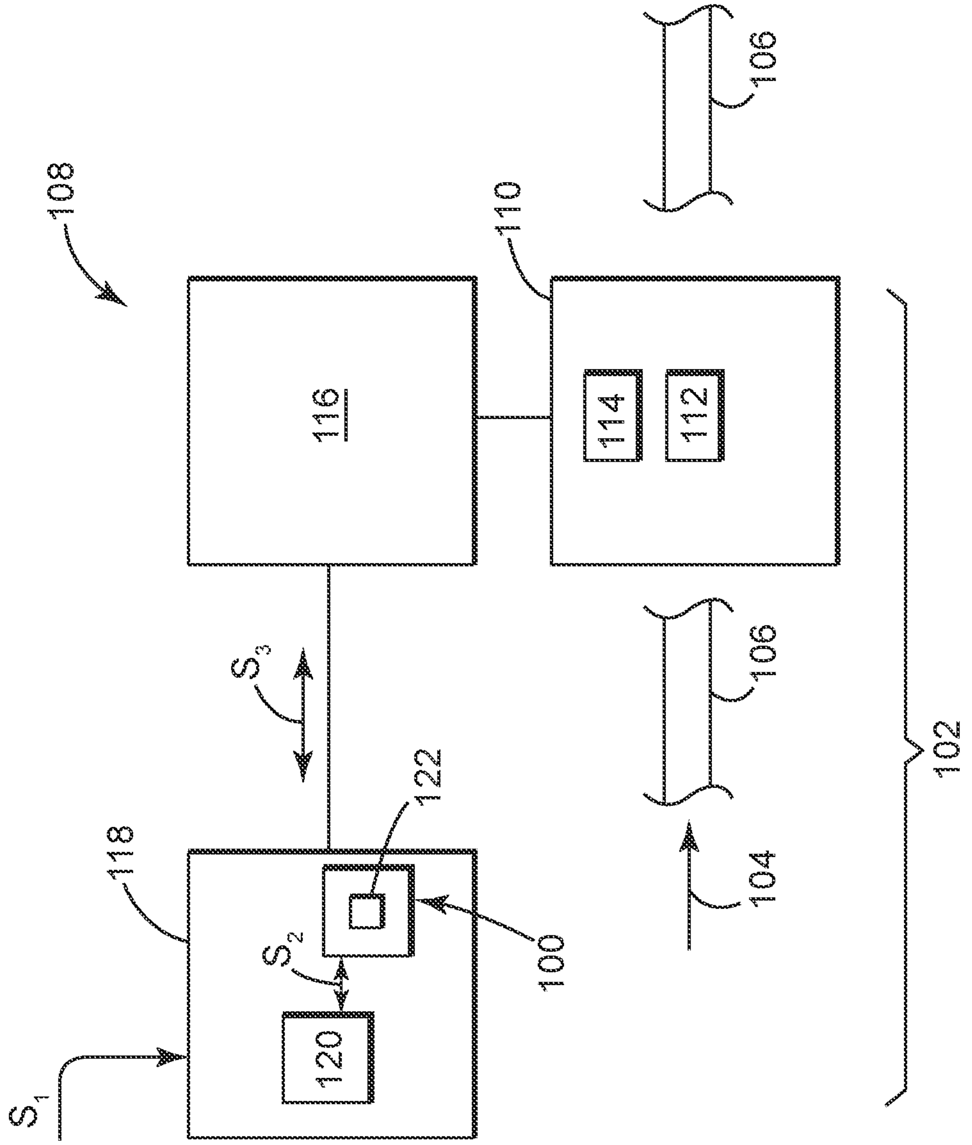
FIG. 1 depicts a schematic diagram of an exemplary embodiment of a pneumatic relay.

Where applicable, like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

The drawings and any description herein use examples to disclose the invention. These examples include the best mode and enable any person skilled in the art to practice the invention, including making and using any devices or systems and performing any incorporated methods. An element or function recited in the singular and proceeded with the word "a" or "an" should be understood as not excluding plural of said elements or functions, unless such exclusion is explicitly recited. References to "one embodiment" or "one implementation" should not be interpreted as excluding the existence of additional embodiments or implementations that also incorporate the recited features.

DESCRIPTION

The discussion now turns to describe features of the embodiments shown in drawings noted above. The embodiments here improve on the design of conventional relays or "amplifiers" that use fixed orifices to bleed actuating media at steady state. The fixed orifice addresses control issues that occur due to a non-linearity in performance of certain valves found in these amplifiers. This non-linearity or "dead zone" may delay response of amplifiers to increases in a supply signal from steady state. Maintaining a steady bleed through the fixed orifice outfits amplifiers to provide precise and stable control of any corresponding flow control. The proposed design not only maintains this level of control, but it also eliminates bleed of actuating media from the amplifier to atmosphere at steady state (or when there is no valve travel). Other embodiments are within the scope of this disclosure.

FIG. 1 depicts an example of a pneumatic relay 100. This example is found at a distribution network 102, typically designed to carry material 104 through a network of conduit 106. The relay 100 may be part of a flow control 108 that has a valve body 110 to connect in-line with the conduit 106. The valve body 110 may house a seat 112 and a closure member 114, which can move to positions relative to the seat 112 to regulate flow of material 104. The flow control 108 can manage the positions of the closure member 114 with an actuator 116. A controller 118 connects with the actuator 116. The controller 118 may have operating hardware 120 that connects to the relay 100. The operating hardware 120 may convert an incoming pneumatic supply signal $S_1$ into an amplifier input signal $S_2$ that operates a variable orifice 122 in the relay 100 to regulate flow of an actuator control signal $S_3$.

Broadly, the pneumatic relay 100 may be configured to avoid bleed to atmosphere. These configurations may embody devices that raise pressure or volume flow of an input signal, preferably by some linearly proportional amount. The devices include relays, as well as "amplifiers" or "boosters." These devices find use in flow control systems that are resident at or in proximity to a pneumatically-actuated valve.

The distribution system 102 may be configured to deliver or move resources. These configurations may embody vast infrastructure. Material 104 may comprise gases, liquids, solids, or mixes, as well. The conduit 106 may include pipes or pipelines, often that connect to pumps, boilers, and the like. The pipes may also connect to tanks or reservoirs. In many facilities, this equipment forms complex networks.

The flow control 108 may be configured to regulate flow of material 104 through the conduit 106 in these complex networks. These configurations may include control valves and like devices. The valve body 110 in such devices is often made of cast or machined metals. This structure may form a flange at the openings I, O. Adjacent pipes 106 may connect to these flanges to allow material 104 to flow through the device, for example, through an opening in the seat 112. The closure member 114 may embody a metal disc or metal "plug." The actuator 116 may use pneumatics or hydraulics to regulate the position of the plug 114, which in turn manages flow of material 104 through the seat 112 into the pipes 106 downstream of the device.

The controller 118 may be configured to process and generate signals. These configurations may connect to a control network (or "distributed control system" or "DCS"), which maintains operation of all devices on process lines to ensure that materials flow in accordance with a process. The DCS may generate control signals with operating parameters that describe or define operation of the control valve 108 for this purpose. The operating hardware 120 may employ electrical and computing components (e.g., processors, memory, executable instructions, etc.). These components may also include electro-pneumatic devices that operate on incoming pneumatic supply signal $S_1$. These components ensure that the outgoing actuator control signal $S_3$ to the actuator 116 is appropriate for the control valve 108 to supply material 104 downstream according to process parameters.

The variable orifice 122 may be configured for precise control of the actuator control signal $S_3$. These configurations may include devices that incorporate valves that operate in response to changes in flow of actuating media, including the amplifier input signal $S_2$. At steady state, these valves may prevent flow or "bleed" of actuating media, thus eliminating a source of waste, both in terms of cost to operate pumps or compressors at the facility that pressurize incoming pneumatic supply signal $S_1$ or emission of potential greenhouse gasses to atmosphere.

Figure 2:
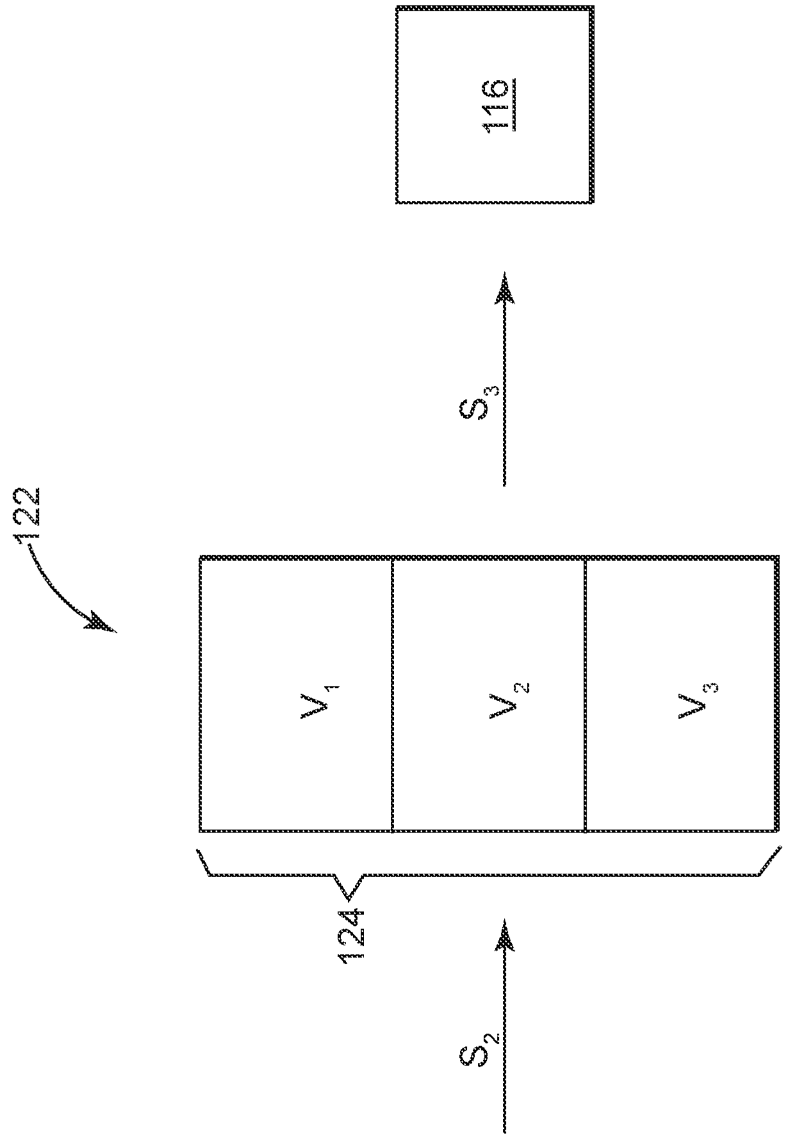
FIG. 2 depicts a schematic diagram of an example of the pneumatic relay of FIG. 1.

FIG. 2 depicts an example of the pneumatic relay 100 of FIG. 1. The variable orifice 122 may include a main flow control 124 that controls flow out of the relay 100 to the actuator 116 (as the actuator control signal $S_3$). The main flow control 124 may include a pair of "main" valves that operate as a supply valve $V_1$ and a vent valve $V_2$. The device may also include a "bleed" valve $V_3$. In one implementation, the valves $V_1$, $V_2$, $V_3$ are closed at steady state to prevent changes in the actuator control signal $S_3$ to the actuator 116 that would, for example, correspond with movement or travel of the flow control 108. The vent valve $V_1$ opens in response to a decrease in the amplifier input signal $S_2$. This response allows material to vent from actuator 116 via the relay 100. On the other hand, the bleed valve $V_3$ opens first in response to an increase in the amplifier input signal $S_2$. This response may cause a (slight) increase in the actuator control signal $S_3$ to the actuator 116. As the amplifier input signal $S_2$ increases, the bleed valve $V_3$ will continue to open until it reaches its fully-opened state. The supply valve $V_1$ then opens in response to further increases in the amplifier input signal $S_2$.

Figure 3:
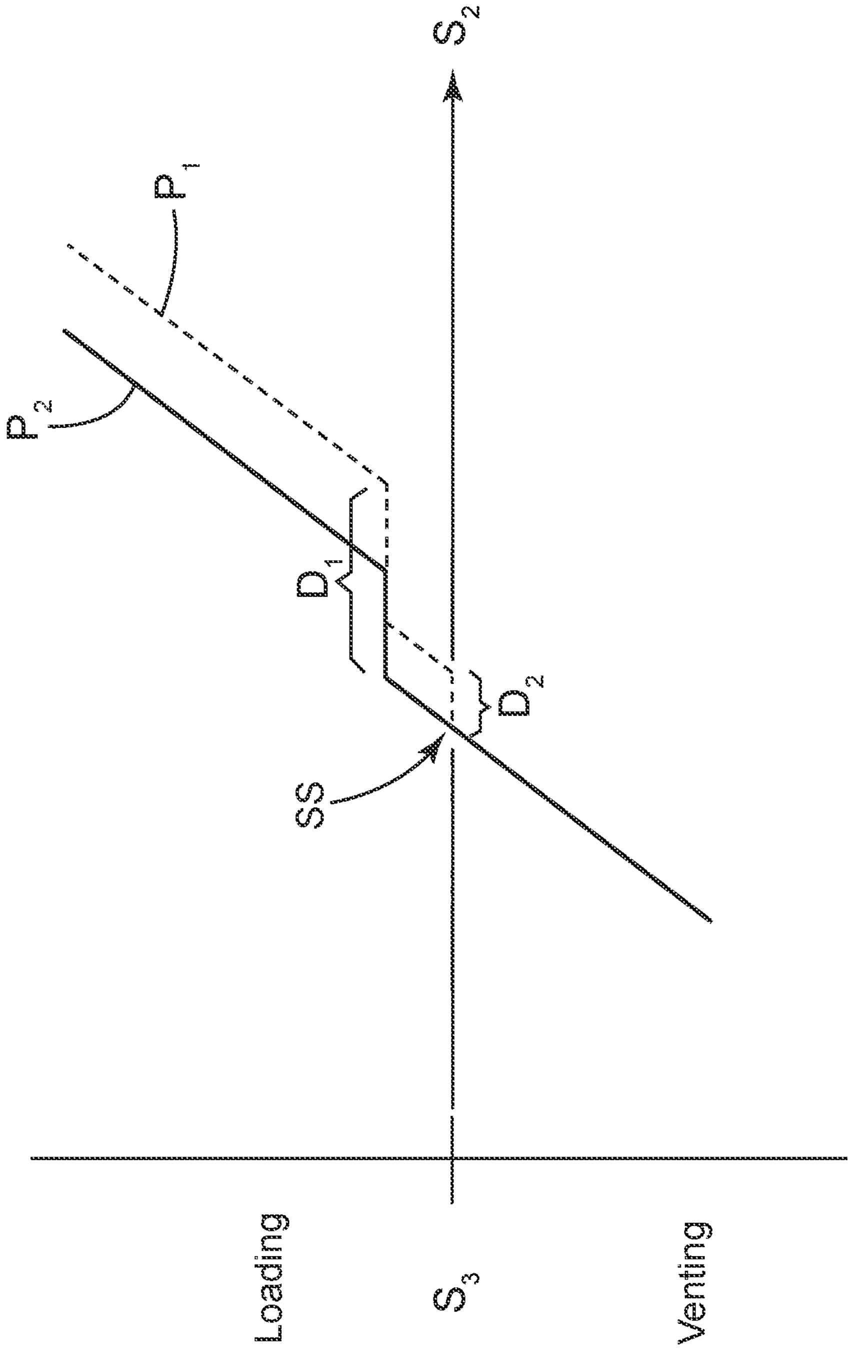
FIG. 3 depicts a plot of performance curves for the pneumatic relay of FIG. 2.

FIG. 3 depicts a plot of exemplary performance for the example relay 100 of FIG. 2. The plot includes performance curves ($P_1$, $P_2$) that describe exemplary operation for both the proposed design of the relay 100 (that does not bleed actuating media at steady state SS) and conventional designs (that bleed actuating media through a fixed orifice at steady state SS), respectively. Both designs exhibit a "main" dead zone $D_1$, where an increase in the amplifier input signal $S_2$ does not result in any change in the actuator control signal $S_3$. The dead zone $D_1$ corresponds with response of the main valve that is found in the proposed design (e.g., supply valve $V_2$) and in the fixed-orifice, conventional design. Use of the bleed valve $V_3$ also introduces a small dead zone $D_2$ into the performance curve $P_1$. However, the tradeoff for this nearly negligible change in performance (at the dead zone $D_2$) is outweighed significantly by the benefits of having the relay 100 effectively not bleed any amplifier input signal $S_2$ at steady state SS. The relay 100 is comparatively much more energy efficient and environmentally friendly, and performs just as well to control of the actuator 116 around steady state SS.

Figure 4:
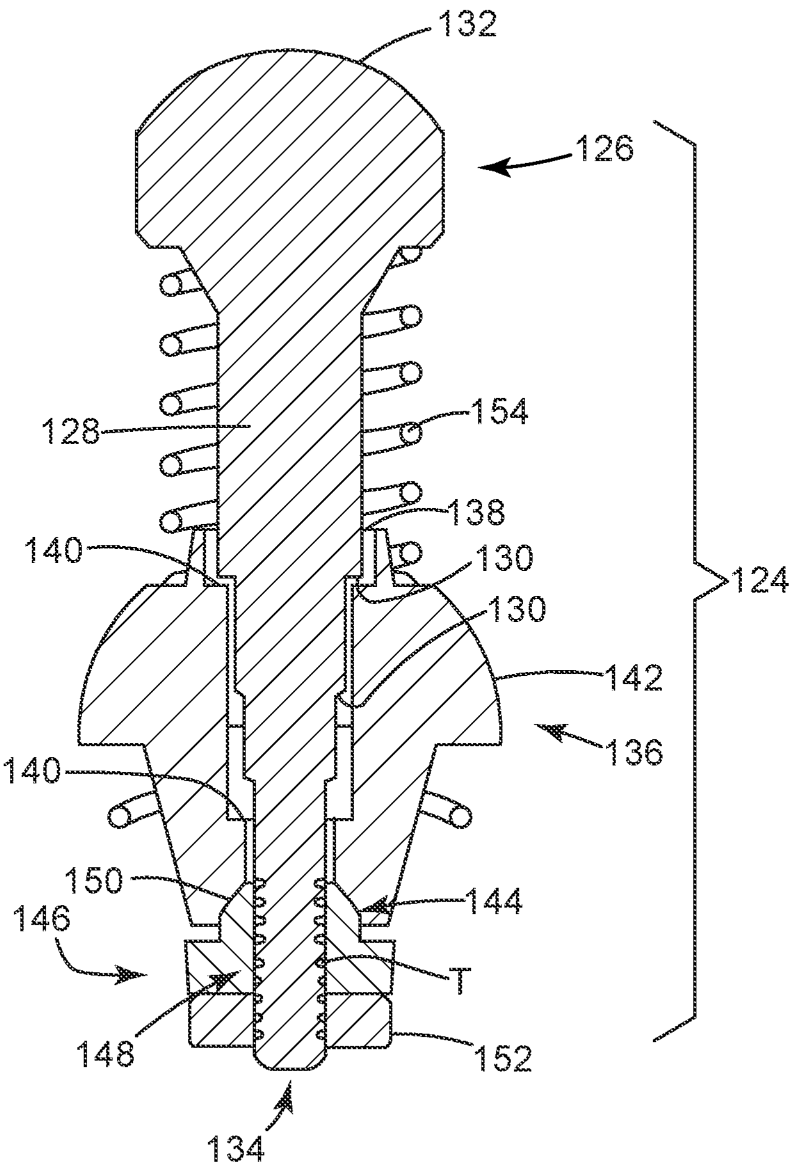
FIG. 4 depicts an elevation view of the cross-section of an exemplary structure for the pneumatic relay of FIG. 2.

FIG. 4 depicts an elevation view of the cross-section of exemplary structure for use in the relay 100 of FIG. 2. The main flow control 124 may include a vent plug 126 with an elongate body 128 that changes in diameter along its length. These changes may form shoulders 130. On one end, the elongate body 128 may form a seat contact surface 132. The other end of the elongate body 128 may have a threaded end 134. A supply plug 136 may include a central bore 138 that receives the elongate body 128. Changes in diameter of the central bore 138 may form several shoulders 140. At one end, the supply plug 136 may have a seat contact surface 142. Its other end may have a recess 144. In one implementation, a bleed plug 146 may reside in the recess 144. The bleed plug 146 may have a central bore 148, for example, with threads T to allow it to screw onto an exposed portion of threaded end 134 of the vent plug 126. The bleed plug 146 may have a seat contact surface 150. A nut 152 or like threaded implement may lock the bleed plug 144 onto the elongate body 128, preferably to prevent it from backing off of the threaded end 134. The device may also include a first spring 154 that interposes between the vent plug 126 and the supply plug 136.

Figure 5:
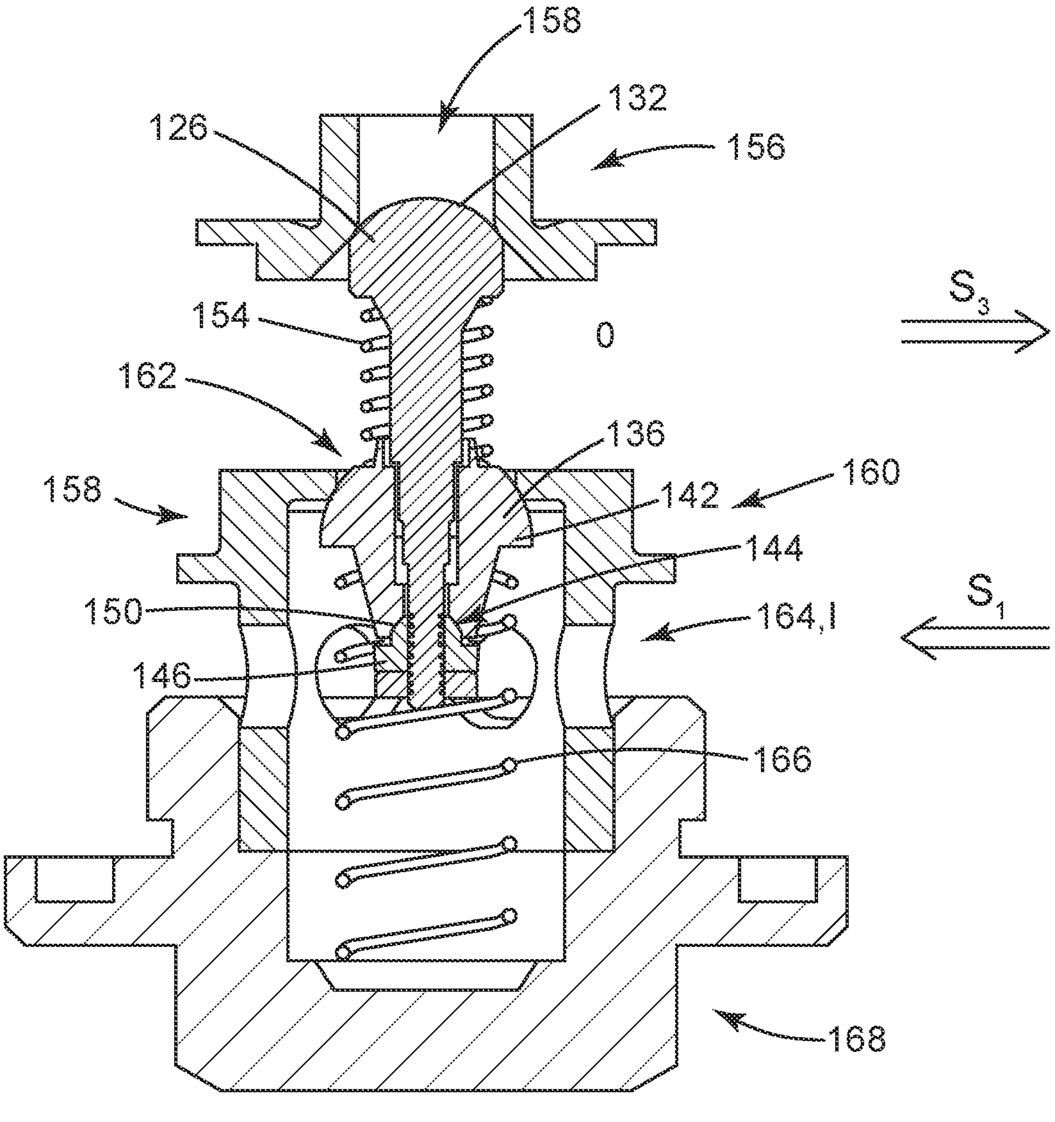
FIG. 5 depicts the cross-section of FIG. 5 with additional exemplary structure for the pneumatic relay.

FIG. 5 depicts an elevation view of the cross-section of the relay 100 of FIG. 4 with additional details for an implementation of the device. This example includes a vent seat 156 with an aperture 158. The device may also include a supply seat 160. This component may have a central aperture 162 and a supply aperture 164, often disposed about the periphery or circumferences of the supply seat 160. The design may also require a second spring 166 that interposes between the supply plug 136 and a surface of an end cap 168. This construction prevents bleed of the incoming pneumatic supply signal $S_1$ at steady state because the seat contact surface 150 of the bleed plug 146 stays in contact with a surface of the recess 144, the seat contact surface 142 of the supply plug 136 stays in contact with a surface of the supply seat 158, and the seat contact surface 132 of the vent plug 126 stays in contact with a surface of the vent seat 156. As a result, this arrangement maintains parameters of the actuator control signal $S_3$ to the actuator 116 at steady state.

Figure 6:
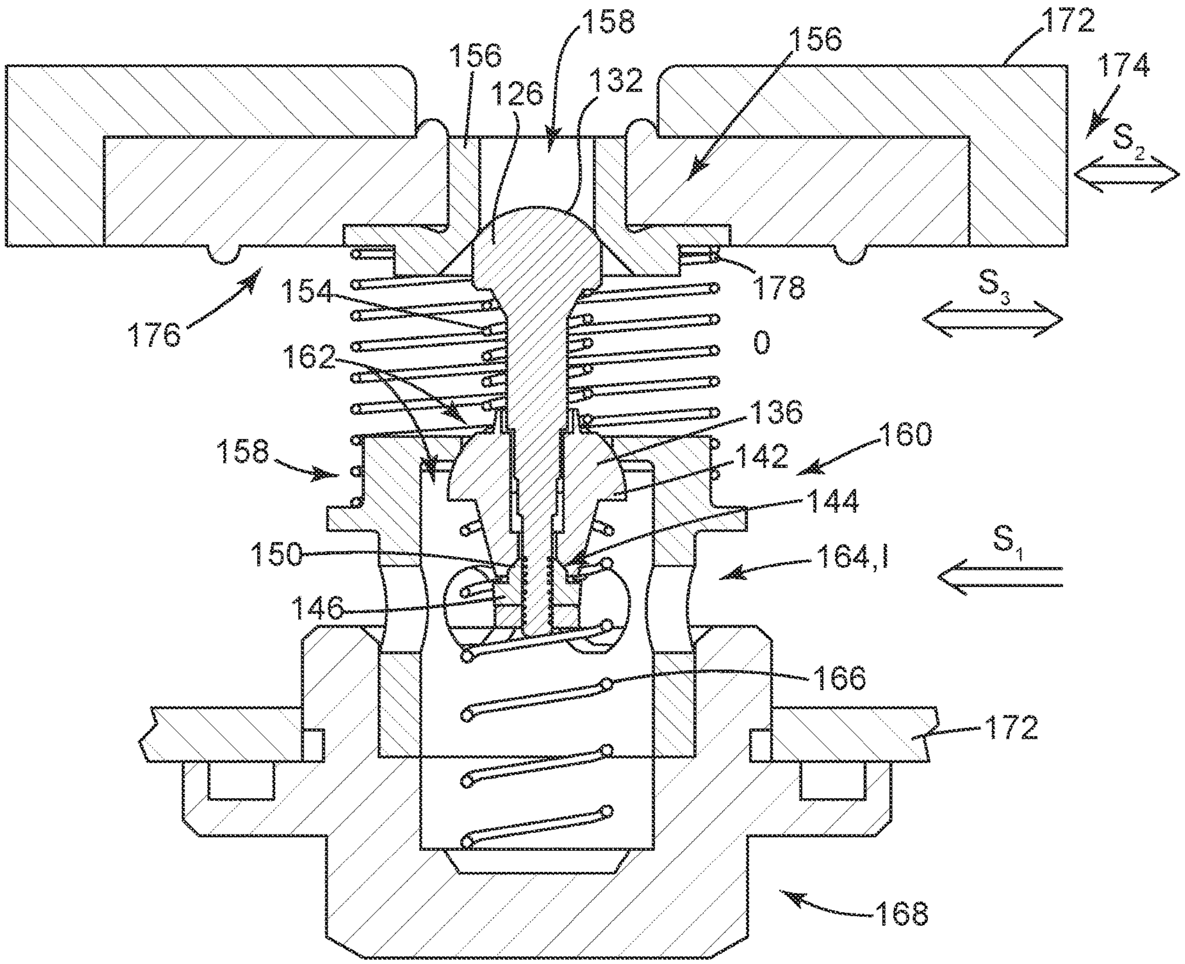
FIG. 6 depicts the cross-section of FIG. 5 with additional exemplary structure for the pneumatic relay.

FIG. 6 also depicts the cross-section of FIG. 5. The relay 100 may include a housing, shown generally in the diagram as 172. An opening 174 in the housing 172 may allow the amplifier input signal $S_2$ to impinge on a diaphragm assembly 176. A spring 178 may interpose between the vent seat 156 and the supply seat 160. In this example, an increase in the amplifier input signal $S_2$, will first cause the bleed plug 146 to open (relative to its contact position in the recess 144) as it overcomes the spring force of the first spring 154. This feature will increase actuator control signal $S_3$ that exists the relay 100. Any further increase in the amplifier input signal $S_2$ will open the supply plug 136 (relative to its contact position in the supply seat 160), which further increases the actuator control signal $S_3$.

Figure 7:
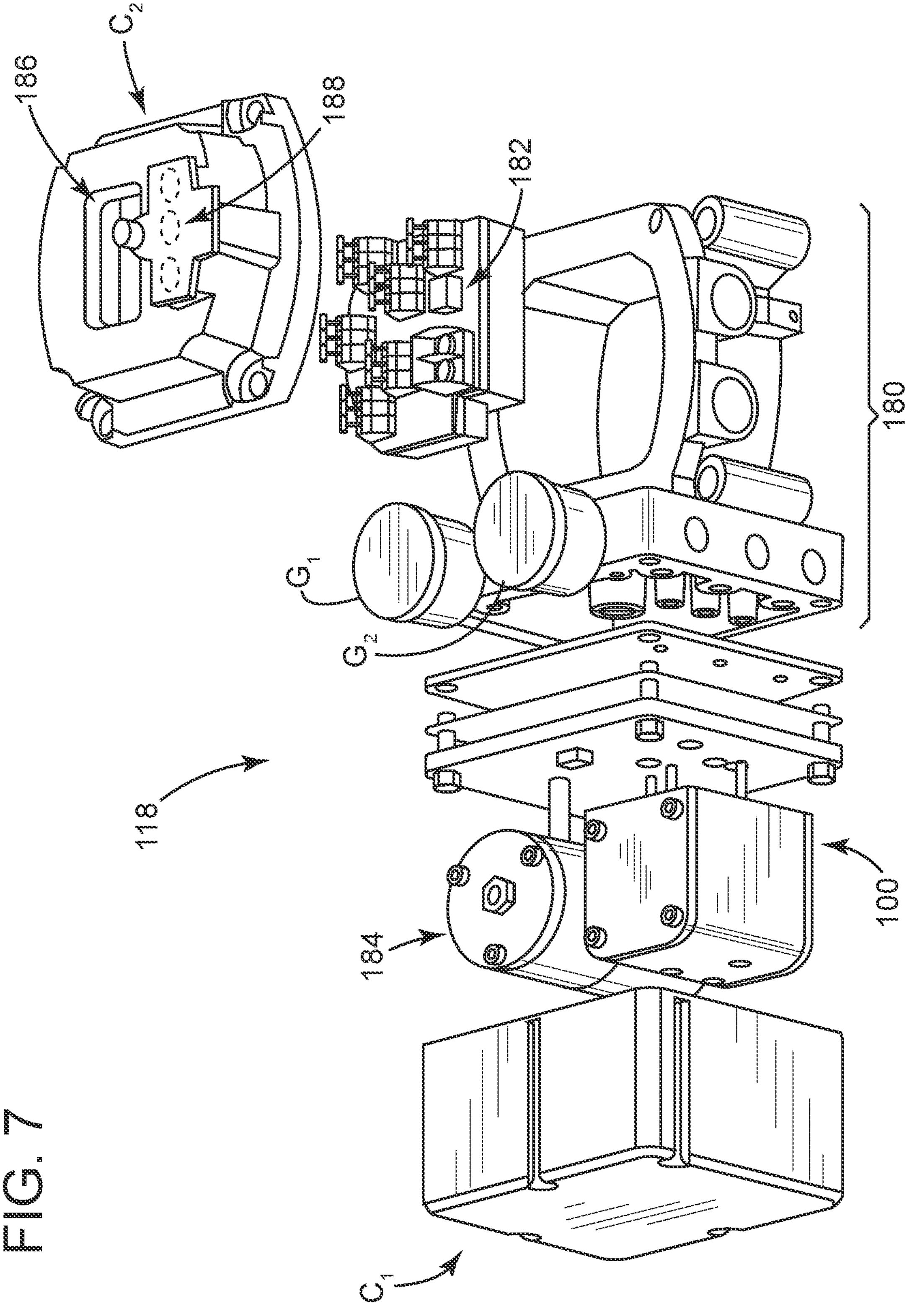
FIG. 7 depicts a perspective view of exemplary structure for a controller that includes the relay of FIG. 1 in exploded form.

FIG. 7 depicts a perspective view of an example of the controller 118 in exploded form. This structure may include a manifold having a manifold body 180, typically machined or formed metal, plastic or composite. The device may include one or more boards 182 with processing hardware disposed thereon. Other hardware may include a current-to-pressure converter 184, which along with the relay 100 can generate the actuator control signal $S_3$ (for example, instrument air) to the actuator 116. As also shown, the controller 100 may have hardware to protect the control components. This hardware may include an enclosure, shown as covers $C_1$, $C_2$ in this example. The covers $C_1$, $C_2$ may secure to the manifold body 182 to protect the control components from conditions that prevail in the environment surrounding the flow control 108. One of the covers $C_2$ may incorporate a display 186 and a pushbutton input device 188 that may operate as the primary local user interface to allow an end user (e.g., technician) to interact with the controller 100. This feature may be important for regular maintenance, configuration, and setup, for example, to allow the end user to exit from valve operating mode and step through a menu structure to manually perform functions such as calibration, configuration, and monitoring. In one implementation, the controller 118 may further include one or more gauges $G_1$, $G_2$ that can provide an indication of the flow conditions (e.g., pressure, flow rate, etc.) of the fluid that the controller 100 uses to operate the flow control 108.

Figure 8:
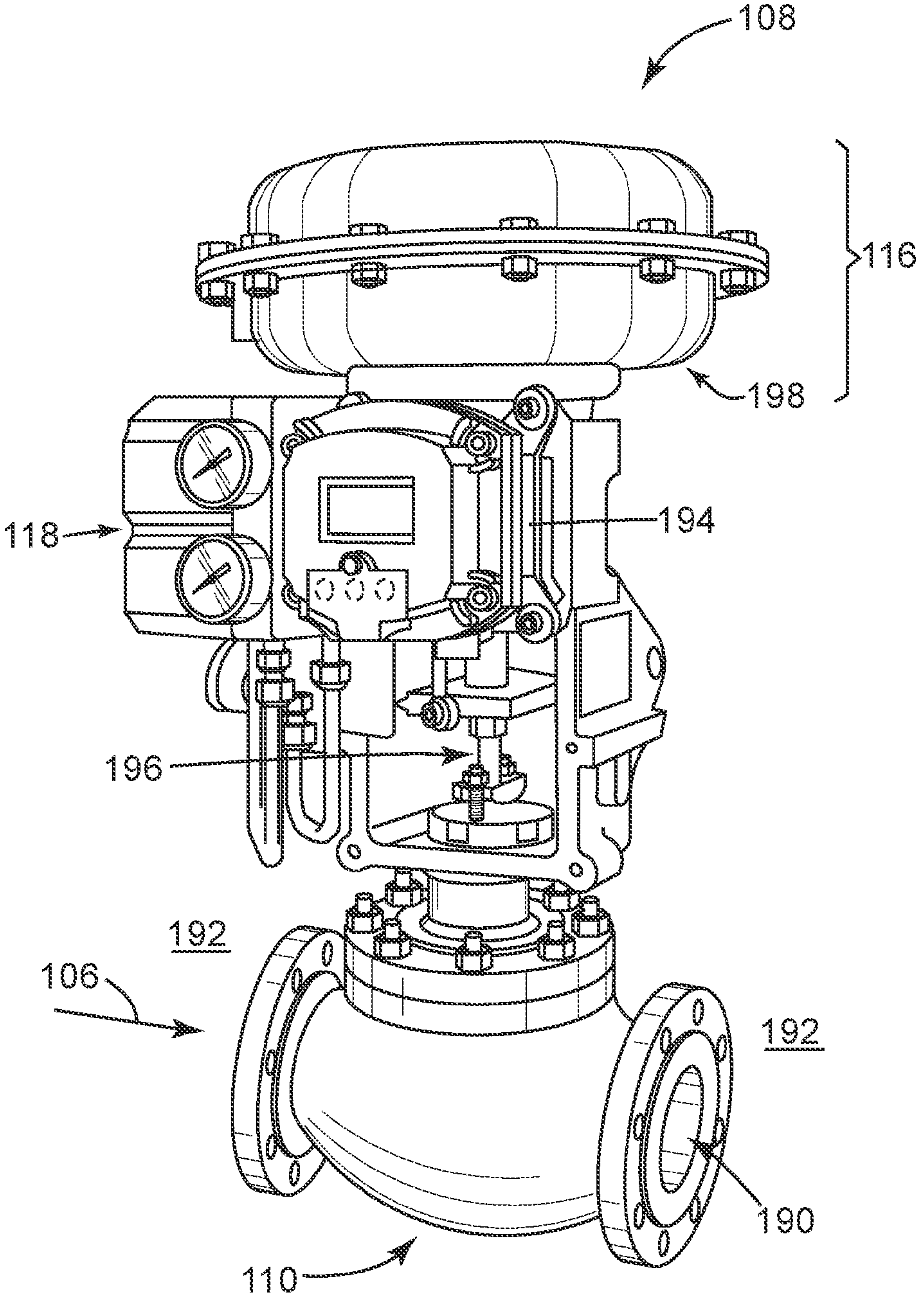
FIG. 8 depicts a perspective view of exemplary structure for a flow control that may incorporate the controller of FIG. 7.

FIG. 8 depicts a perspective view of exemplary structure for the flow control 108. The valve body 110 may form a flow path 190 with flanged, open ends 192. The controller 118 may fasten to a bracket 194 that is part of the flow control 108. Fasteners such as bolts are useful for this purpose. Valve components like the seat and the closure member may reside inside of the body 110 (and, thus, are hidden in the present view). The device may include a valve stem 196 that connects the closure member with the actuator 116. In one implementation, the actuator 116 may include a bulbous housing 198, typically with two pieces that clamp about the edges to entrap a diaphragm (not shown) round the periphery. As noted herein, the actuator control signal $S_3$ may pressurize an upper portion of the housing 198 that acts on one side of the diaphragm. An actuator spring in the lower portion of the housing 198 acts on the opposite side of the diaphragm. This construction affects the position of the closure member to regulate flow through the valve body 110.

In view of the foregoing, the improvements here effectively eliminate bleed of actuating media from amplifiers. The embodiments incorporate a variable orifice, described herein as a small bleed valve; however, other device structures may achieve similar results as well. Use of the variable orifice in place of a fixed orifice prevents flow of actuating media at steady state. This feature saves energy and avoids unnecessary emissions. It does not, however, sacrifice any control over the corresponding actuator and, thus, flow controls that adapt amplifiers of the proposed design can still maintain precise control over flow into a process line.

Examples appear below that include certain elements or clauses one or more of which may be combined with other elements and clauses to describe embodiments contemplated within the scope and spirit of this disclosure. The scope may include and contemplate other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A flow control, comprising:
an actuator;
a controller coupled with the actuator to deliver an actuator control signal to the actuator;
an amplifier disposed in the controller and configured to control the actuator control signal, the amplifier comprising:
a main valve; and
a bleed valve coupled with the main valve,
wherein the bleed valve opens before the main valve in response to an increase in an amplifier input signal to the main valve, and
wherein the main valve comprises a plurality of moveable plugs, one of which vents the actuator control signal in response to a decrease in the amplifier input signal.

2. The flow control of claim 1, wherein the main valve comprises a supply valve and a vent valve.

3. The flow control of claim 1, wherein the main valve comprises a supply valve coupled with the bleed valve.

4. The flow control of claim 1, wherein the main valve comprises a first plug and the bleed valve comprises a second plug that interfaces with the first plug to prevent or permit flow.

5. The flow control of claim 1, further comprising:
a current-to-pressure converter coupled with the amplifier to provide the amplifier input signal.

6. The flow control of claim 1, wherein the actuator control signal pressurizes an upper portion of the actuator.

7. The flow control of claim 1, wherein the actuator comprises a two-piece housing.

8. The flow control of claim 1, further comprising:
a valve stem coupled with the actuator; and
a closure member coupled to the valve stem,
wherein the closure member is moveable relative to a seat.

9. The flow control of claim 1, further comprising:
a spring disposed about one of the plurality of moveable plugs.

10. The flow control of claim 1, further comprising:
a first spring and a second spring, one each disposed about one of plurality of moveable plugs.

11. A flow control, comprising:
an actuator;
a controller coupled with the actuator to deliver an actuator control signal to the actuator;
an amplifier disposed in the controller and configured to control the actuator control signal, the amplifier comprising:
a main valve; and
a bleed valve coupled with the main valve,
wherein the bleed valve opens before the main valve in response to an increase in an amplifier input signal to the main valve, and
wherein the main valve comprises a plurality of moveable plugs, one of which opens to allow the amplifier input signal to increase the actuator control signal.

12. The flow control of claim 11, wherein the main valve comprises a supply valve and a vent valve.

13. The flow control of claim 11, wherein the main valve comprises a supply valve coupled with the bleed valve.

14. The flow control of claim 11, wherein the main valve comprises a first plug and the bleed valve comprises a second plug that interfaces with the first plug to prevent or permit flow.

15. The flow control of claim 11, further comprising:
a current-to-pressure converter coupled with the amplifier to provide the amplifier input signal.

16. The flow control of claim 11, wherein the actuator control signal pressurizes an upper portion of the actuator.

17. The flow control of claim 11, wherein the actuator comprises a two-piece housing.

18. The flow control of claim 11, further comprising:

a valve stem coupled with the actuator; and a closure member coupled to the valve stem, wherein the closure member is moveable relative to a seat.

19. The flow control of claim 11, further comprising:

a spring disposed about one of the plurality of moveable plugs.

20. The flow control of claim 11, further comprising:

a first spring and a second spring, one each disposed about one of plurality of moveable plugs.

* * * * *